United States Patent Office 3,454,554
Patented July 8, 1969

3,454,554
AMINOALKYLIMINODIBENZYL COMPOUNDS
John H. Biel, Milwaukee, and Claude I. Judd, Thiensville, Wis., assignors to Colgate-Palmolive Company, Milwaukee, Wis., a corporation of Delaware
No Drawing. Continuation-in-part of application Ser. No. 31,524, May 25, 1960. This application Oct. 14, 1960, Ser. No. 62,564
Int. Cl. C07d 41/08, 41/00; A61k 27/00
U.S. Cl. 260—239         3 Claims

ABSTRACT OF THE DISCLOSURE

The compounds are members selected from desmethylimipramine and nontoxic addition salts thereof and are useful in the treatment of depression. Desmethylimipramine is also known as N-(3-methylaminopropyl)-iminodibenzyl, 5-(γ-methylaminopropyl)-iminodibenzyl, desipramine or DMI.

The present application is a continuation-in-part of our earlier copending application Ser. No. 31,524 filed May 25, 1960, now abandoned.

This invention relates to derivatives of iminodibenzyl. More particularly, this invention is concerned with novel N-(aminoalkyl)iminodibenzyl and N-(alkylaminoalkyl)-iminodibenzyl compounds, processes of producing the same, intermediates useful in such processes, and novel pharmaceutical uses for such compounds.

According to the present invention there are provided novel N-(aminoalkyl)iminodibenzyl and N-(alkylaminoalkyl)iminodibenzyl compounds of the formula

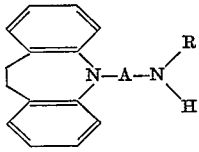

wherein A is a lower alkylene of 2 to 5 carbons with at least 2 carbons between the connecting nitrogens, and R is hydrogen or a lower alkyl of 1 to 5 carbons and particularly is methyl, novel intermediates useful in producing such compounds, as well as nontoxic acid addition salts thereof.

The compounds of this invention can be produced by reacting an alkali metal salt of iminodibenzyl with a reactive N-benzyl-N-lower alkyl aminoalkyl halide or N,N-dibenzylaminoalkyl halide to form an intermediate N-(N-benzyl-N-lower alkyl aminoalkyl)-iminodibenzyl or N-N-(N,N - dibenzylaminoalkyl) - iminodibenzyl which is then subjected to hydrogenolytic cleavage of the N-benzyl group or the N,N-dibenzyl group to form the corresponding N-(N-lower alkyl aminoalkyl)-iminodibenzyl or N-(aminoalkyl)-iminodibenzyl.

The process to produce the N-(N-lower alkyl aminoalkyl)-iminodibenzyl compounds can be represented as follows:

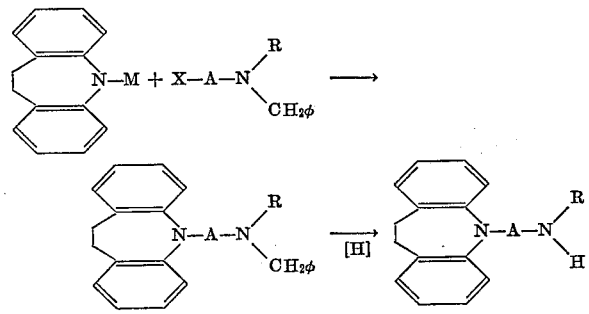

wherein M is a reactive alkali metal and particularly is sodium, potassium or lithium, X is a reactive halogen and particularly is chlorine, bromine or iodine, A is a lower alkylene of 2 to 5 carbons, advisably in a straight chain, R is a lower alkyl of 1 to 5 carbons, and φ is phenyl. Instead of φ being phenyl, other aryl hydrocarbon groups can be present in place thereof such as diphenyl or naphthyl, but these are not ordinarily used because phenyl functions wholly satisfactorily and the N-benzyl reactants are more readily available.

The process of producing the N-(aminoalkyl)-iminodibenzyl compounds can be represented as follows:

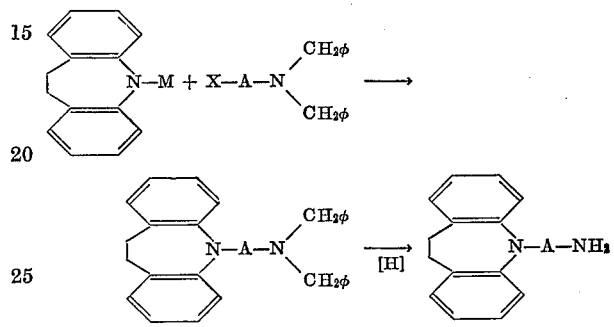

wherein M, X, A and φ have the significance previously assigned.

The alkali metal iminodibenzyl salt used as a reactant can be prepared by reacting iminodibenzyl with an alkali metal hydride or amide such as sodium hydride, lithium amide, sodium amide, potassium amide or lithium hydride. The reaction is readily effected by bringing the reactants together in an inert anhydrous high boiling liquid reaction medium such as xylene, toluene, tetralin or cumene. Elevated temperatures such as about 75 to 150° C. are generally suitable for the reaction. In general, however, the reflux temperature is utilized since it permits ready temperature control. The alkali metal salt of iminodibenzyl forms rapidly and the reaction is generally completed in about 1 to 3 hours. Following termination of the reaction the product can be isolated if desired but this is ordinarily not done since it can be used as present in the reaction mixture.

Reaction between the alkali metal iminodibenzyl salt and the N-benzyl-N-lower alkyl aminoalkyl halide or N,N-dibenzylaminoalkyl halide can be effected by bringing the reactants together in a suitable inert high boiling liquid reaction medium such as toluene, xylene, tetralin, dimethyl formamide, dioxane aranisole, or cumene. The reaction mixture from the formation of the alkali metal iminodibenzyl salt can be used as the reactant and solvent source to which the N-benzyl-N-lower alkyl aminoalkyl halide or N,N-dibenzylaminoalkyl halide can be added. Elevated temperatures of about 75 to 150° C., and particularly the reflux temperature, can be employed to effect reaction. About 3 to 20 hours is generally adequate to substantially complete the reaction. After the reaction is terminated the product can be recovered by filtering the reaction mixture, distilling off the solvent and fractionally distilling the high boiling base in vacuo.

Among the N-benzyl-N-lower alkyl aminoalkyl halides which can be used in the process are N-benzyl-N-methylaminopropyl chloride, N - benzyl-N - ethylaminoethyl bromide, 2-(N-benzyl-N-propylamino)-propyl chloride and 2-(N-benzyl-N-methylamino)propyl chloride.

Some N,N-dibenzylaminoalkyl halides that can be used in the process are N,N-dibenzylaminoethyl chloride, N,N-dibenzylaminopropyl chloride, N,N-dibenzylaminobutyl bromide and 2-(N,N-dibenzylamino)-propyl chloride.

Representative of the compounds produced by the described reaction are:

N-(3-N-benzyl-N-methylaminopropyl)-iminodibenzyl,
N-(2-N-benzyl-N-ethylaminoethyl)-iminodibenzyl,
N-(2-N-benzyl-N-methylaminopropyl)-iminodibenzyl,
N-(4-N-benzyl-N-ethylaminobutyl)-iminodibenzyl,
N-(3-N-benzyl-N-butylaminopropyl)-iminodibenzyl,
N-(3-N,N-dibenzylaminopropyl)-iminodibenzyl,
N-(2-N,N-dibenzylaminoethyl)-iminodibenzyl,
N-(2-N,N-dibenzylaminoethyl)-iminodibenzyl,
N-(4-N,N-dibenzylaminobutyl)-iminodibenzyl and
N-(2-N,N-dibenzylaminopropyl)-iminodibenzyl.

The N-(N-benzyl-N-lower alkyl aminoalkyl)-iminodibenzyl and N-(N,N-dibenzylaminoalkyl)-iminodibenzyl compounds are converted to the corresponding compounds lacking the N-benzyl or N,N-dibenzyl (or other hydrocarbon aryl-methyl group) by hydrogenolytic cleavage of the benzyl group(s). This can be accomplished by catalytic hydrogenation by adding the N-(N-benzyl-N-lower alkyl aminoalkyl)-iminodibenzyl or N-N,N-dibenzylaminoalkyl)-iminodibenzyl, preferably as an acid addition salt such as the hydrochloride, to a suitable solvent such as water or a lower alcohol. Platinum, platinum oxide and palladium are catalysts which are useful in effecting the hydrogenation. Hydrogen pressures of about 30 to 3,000 p.s.i., and from room temperature to moderately elevated temperatures (100° C.) are suitable for effecting the reaction. The hydrogenation proceeds quickly and its progress can be measured by the hydrogen uptake. When the hydrogen uptake ceases the reaction may be considered completed. After filtering the reaction mixture it may be evaporated to dryness and the product triturated with a solvent such as ether and separated by filtration.

Representative of the N-(alkylaminoalkyl)iminodibenzyl compounds which are produced in this way are:

N-(3-methylaminopropyl)-iminodibenzyl,
N-(2-ethylaminoethyl)iminodibenzyl,
N-(2-methylaminopropyl)-iminodibenzyl,
N-(4-ethylaminobutyl)-iminodibenzyl and
N-[3-N-(butylamino)propyl]-iminodibenzyl, while some of the N-(aminoalkyl)-iminodibenzyl compounds similarly produced are:

N-(3-aminopropyl)-iminodibenzyl,
N-(2-aminoethyl)-iminodibenzyl,
N-(2-aminopropyl)-iminodibenzyl,
N-2-(3-aminopropyl)-iminodibenzyl and
N-(4-aminobutyl)-iminodibenzyl.

The compounds of this invention form water soluble acid addition salts with organic and inorganic acids such as hydrochloric acid, hydrobromic acid, sulphuric acid, phosphoric acid, methane sulphonic acid, ethane disulphonic acid, acetic acid, citric acid, maleic acid, succinic acid, tartaric acid, benzoic acid and phthalic acid.

The N-(alkylaminoalkyl)-iminodibenzyl and N-(aminoalkyl)-iminodibenzyl compounds of this invention as nontoxic acid addition salts are potent analgetics and, in addition, are potent hypotherimc agents. They are virtually inactive as antihistaminic agents. These compounds also sensitize the animal to norepinephrine and thus facilitate sympathetic nerve stimulation. This pharmacologic property endows these drugs with potential antidepressant effects in humans suffering from mental depression.

The most active compounds of this invention appear to be those in which A is n-propyl and particularly N-(3-methylaminopropyl)-iminodibenzyl. This compound is about three times as potent an analgetic as N-(3-dimethylaminopropyl)-iminodibenzyl. (See U.S. Patent No. 2,554,736, and Canadian Psychiatric Assoc. Journal, vol. 4, page S70 (1959)). Furthermore, the compound of this invention is a potent hypothermic agent whereas this prior art compound is ineffective for this purpose. In addition, this new compound is inactive as an antihistaminic agent whereas N-(3-dimethylaminopropyl)-iminodibenzyl exhibits definte antihistaminic properties.

The compounds provided by this invention can be administered to animals as pure compounds, in the form of nontoxic acid addition salts, but to obtain a more practical size to dosage relationship one or more of the compounds is combined with a suitable pharmaceutical carrier and made into unit-dosage forms.

Pharmaceutical carriers which are liquid or solid can be used. The preferred liquid carrier is water. Flavoring materials can be included in the solutions as desired.

Solid pharmaceutical carriers such as starch, sugar and talc can be used to form powders. The powders can be used as such or be tableted, or be used to fill gelatin capsules. Suitable lubricants like magnesium stearate, binders such as gelatin and disintegrating agents like sodium carbonate in combination with citric acid can be used to form the tablets.

Unit dosage forms such as tablets and capsules can contain any suitable predetermined amount of one or more of the compounds and can be administered one or more at a time at regular intervals. Such forms should, however, contain a concentration of about 0.1 to 10% by weight of the compound of this invention.

A typical tablet can have the composition:

|  | Mg. |
|---|---|
| (1) N-(3-methylaminopropyl)-iminodibenzyl | 10 |
| (2) Starch U.S.P. | 57 |
| (3) Lactose U.S.P. | 73 |
| (4) Talc U.S.P. | 9 |
| (5) Stearic acid | 6 |

Powders 1, 2 and 3 are slugged, then granulated, mixed with 4 and 5, and tableted.

The following examples are presented to illustrate the preparation of representative compounds within the scope of the invention.

Example 1.—N-(3-N-benzyl-N-methylaminopropyl)-iminodibenzyl

Iminodibenzyl (19.5 g., 0.1 mole) was converted to the anion by refluxing for 3 hours in 150 cc. of xylene with 4.0 g. of sodamide. Then the mixture was cooled to 50° C., 20.0 g. (0.1 mole +0.3 g. excess) of N-benzyl-N-methylaminopropyl chloride in a small amount of xylene was added and the mixture refluxed for 20 hours. After cooling, the inorganic salts were separated by filtration, washed with benzene and diluted with ether. The filtrate was washed with water, dried over potassium carbonate and the solvent removed by distillation. Fractionation of the resulting residue afforded 18.2 g. (51.2%) of the product, B.P. 195–201° C. at 40μ.

Analysis.—Calcd. for $C_{25}H_{28}N_2$: N, 7.86. Found: N, 7.79.

Example 2.—N-(3-methylaminopropyl)-iminodibenzyl

A 19.0 g. (0.053 mole) sample of N-(3-N-benzyl-N-methylaminopropyl)-iminodibenzyl in 50 cc. of ethanol was treated with one equivalent of 5% hydrochloric acid solution and hydrogenated over 1.2 g. of 10% palladium-on-charcoal at room temperature. When the theoretical amount of hydrogen had been consumed (11 hours) the reduction was stopped and the catalyst separated by filtration. The filtrate was diluted with water, extracted with ether and made basic with 10% sodium hydroxide. The free base was extracted with ether, dried over potassium carbonate and the solvent removed by distillation leaving 14.9 g. (theory 13.15 g.) of crude product.

A 4.9 g. sample of the crude base was treated with ethereal HCl yielding 4.4 g. of the hydrochloride salt, M.P. 212–215° C. Several recrystallizations from methanolether yielded 4.4 g. of the pure salt, M.P. 215–216° C.

Analysis.—Calcd. for $C_{18}H_{23}N_2Cl$: N, 9.26; Cl−, 11.71. Found: N, 9.18; Cl−, 11.65.

Various changes and modifications of the invention can be made and, to the extent that such variations incorporate the spirit of this invention, they are intended to be included within the scope of the appended claims.

What is claimed is:
1. A compound selected from the group consisting of 5-(γ-methylamino-propyl)-iminodibenzyl and nontoxic addition salts thereof.
2. N-(3-methylaminopropyl)-iminodibenzyl.
3. N-(3-methylaminopropyl)-iminodibenzyl hydrochloride.

References Cited

UNITED STATES PATENTS

| | | |
|---|---|---|
| 2,830,987 | 4/1958 | Gailliot et al. |
| 2,785,160 | 3/1957 | Jacob et al. |
| 2,554,736 | 5/1951 | Haefliger et al. |
| 2,694,706 | 11/1954 | Cusie |

OTHER REFERENCES

Annals of Internal Medicine, vol. 51, page 1041, November 1959, Hollister.

Canadian Psychiatric Assoc. Journal, vol. 3, pages 155–64, October 1958, Lehmann et al.

Brodie et al.: Psychopharmacologia, vol. 2, pp. 467–74, 1961.

Ban et al.: Canadian Medical Assoc. Journal, vol. 86, pp. 1030–31, June 2, 1962.

Herrmann et al. (I): Medicina Experimentalis, vol. 1, pp. 381–85, 1959.

Pulver et al.: Arzneimittel-Forschung, vol. 10, No. 7, July 1960, pp. 530–33.

ALTON D. ROLLINS, *Primary Examiner.*

U.S. Cl. X.R.

260—570.9; 424—244